(12) United States Patent
Hung

(10) Patent No.: US 11,160,637 B2
(45) Date of Patent: Nov. 2, 2021

(54) ORTHODONTIC CORRECTION DEVICE

(71) Applicant: Cheng-Hsiang Hung, New Taipei (TW)

(72) Inventor: Cheng-Hsiang Hung, New Taipei (TW)

(*) Notice: Subject to any disclaimer, the term of this patent is extended or adjusted under 35 U.S.C. 154(b) by 240 days.

(21) Appl. No.: 16/104,061

(22) Filed: Aug. 16, 2018

(65) Prior Publication Data
US 2019/0053877 A1 Feb. 21, 2019

(30) Foreign Application Priority Data
Aug. 17, 2017 (CN) ........................ 201710704699.3

(51) Int. Cl.
| | | |
|---|---|---|
| A61C 7/08 | (2006.01) | |
| A61C 7/36 | (2006.01) | |
| A61C 7/22 | (2006.01) | |

(52) U.S. Cl.
CPC ................ *A61C 7/08* (2013.01); *A61C 7/36* (2013.01); *A61C 7/22* (2013.01)

(58) Field of Classification Search
CPC .... A61C 7/12; A61C 7/14; A61C 7/08; A61C 7/22; A61C 7/36; A61C 5/007
See application file for complete search history.

(56) References Cited

U.S. PATENT DOCUMENTS

| | | | | |
|---|---|---|---|---|
| 4,273,530 A | * | 6/1981 | Broussard | ................ A61C 7/00 433/6 |
| 4,416,626 A | * | 11/1983 | Bellavia | .................. A61C 7/00 433/7 |
| 4,505,672 A | * | 3/1985 | Kurz | ........................ A61C 7/08 433/6 |
| 4,793,803 A | * | 12/1988 | Martz | ...................... A61C 7/08 433/6 |

(Continued)

FOREIGN PATENT DOCUMENTS

| | | |
|---|---|---|
| CN | 106963503 A | 7/2017 |
| EP | 3028664 A2 | 6/2016 |

(Continued)

OTHER PUBLICATIONS

Korean Patent Offic,e Office Action, Patent Applicaiton Serial No. 10-2018-0095436, dated Jan. 16, 2020, Korea.

(Continued)

*Primary Examiner* — Jacqueline T Johanas
*Assistant Examiner* — Shannel Nicole Belk

(57) ABSTRACT

An orthodontic correction device includes a correction unit that is adapted to be removably worn on a dental arch. The correction unit includes at least one first receiving part for receiving at least one first tooth which needs correction. The shape of the first receiving part allows the first tooth to move toward the alveolar bone. At least one elongated opening is formed on the occlusal surface of the correction unit and extends to the lingual surface and the buccal surface of the correction unit. The opening exposes parts of the occlusal surface, the lingual surface and the buccal surface of the first tooth. A force exerting assembly is configured to contact the first tooth through the opening, thereby exerting a force on the first tooth to press the first tooth into the alveolar bone.

10 Claims, 14 Drawing Sheets

(56) References Cited

U.S. PATENT DOCUMENTS

| | | | | |
|---|---|---|---|---|
| 4,880,380 | A | * | 11/1989 | Martz ............... A61C 7/12 433/11 |
| 5,145,364 | A | * | 9/1992 | Martz ............... A61C 7/00 433/18 |
| 5,499,633 | A | | 3/1996 | Fenton |
| 5,645,423 | A | * | 7/1997 | Collins, Jr. ............ A61C 7/36 433/18 |
| 5,683,244 | A | | 11/1997 | Truax |
| 9,675,427 | B2 | * | 6/2017 | Kopelman ............ A61C 7/08 |
| 2004/0007238 | A1 | * | 1/2004 | Eubank ............... A61C 7/08 128/861 |
| 2008/0293003 | A1 | * | 11/2008 | Moss ................. A61C 7/08 433/6 |
| 2014/0363779 | A1 | * | 12/2014 | Kopelman ............ A61C 7/08 433/6 |
| 2015/0079531 | A1 | * | 3/2015 | Heine ............... A61C 7/36 433/19 |
| 2015/0216627 | A1 | * | 8/2015 | Kopelman ............ A61C 7/14 433/6 |
| 2016/0157961 | A1 | * | 6/2016 | Lee ................. A61C 7/002 382/131 |
| 2016/0310236 | A1 | * | 10/2016 | Kopelman ............ G06F 30/00 |
| 2016/0310237 | A1 | * | 10/2016 | Hung ................. A61C 7/08 |
| 2017/0007360 | A1 | | 1/2017 | Kopelman et al. |

FOREIGN PATENT DOCUMENTS

| | | |
|---|---|---|
| KR | 10-1547112 B1 | 8/2015 |
| KR | 10-1676205 B1 | 11/2016 |

OTHER PUBLICATIONS

European Patent Office, Search Report, Patent Application No. 18189415.5, dated Mar. 15, 2019, Europe.

Japan Patent Office, Office Action, Patent Application Serial No. 2018-153109, dated Oct. 23, 2019, Japan.

European Patent Office, Search Report, Patent Application Serial No. 18189415.5, dated Dec. 11, 2018, Europe.

Intellectual Property Office of the Philippines, Search Report, Patent Application Serial No. 1/2018/000223, dated Jan. 16, 2019, Philippine.

China Patent Office, Office Action, Patent Application Serial No. 201710704699.3, dated Mar. 15, 2021, China.

* cited by examiner

US 11,160,637 B2

ORTHODONTIC CORRECTION DEVICE

CROSS REFERENCE TO RELATED APPLICATIONS

The present application claims priority of China Patent Application No. 201710704699.3, filed on Aug. 17, 2017, the entirety of which is incorporated by reference herein.

BACKGROUND OF THE INVENTION

Field of the Invention

The present application relates to an orthodontic correction technology; and in particular to an orthodontic correction device for pressing teeth (or tooth) into the alveolar bone (i.e., achieving intrusion of the teeth).

Description of the Related Art

When a person's teeth are in misalignment, his dental aesthetics, functions and health may be adversely affected. Affected functions include daily activities, such as chewing, pronunciation, and breathing. Dental health problems include dental cavities, periodontal disease and excessive wear of the teeth.

Referring to FIG. 1, a condition in which the teeth are in misalignment is that the second molar 10A of the maxillary dental arch 10 is excessively elongated due to long-term inability to properly bite with the second molar 20A of the mandibular dental arch 20. During the correction process, the second molar 10A of the maxillary dental arch 10 will be pressed upward (as indicated by the arrow in FIG. 1) into the alveolar bone (not shown).

A conventional correction method is to implant a mini-screw M into the maxilla 11 of the patient as an anchorage, and then couple the mini-screw M with the hook (not shown) affixed to the second molar 10A by an elastic member to generate a corrective force to press the second molar 10A upward into the alveolar bone. However, the use of a mini-screw M is invasive and can easily cause local inflammation, which causes the patient to feel discomfort during the correction process. In addition, the mini-screw M and the hook affixed to the second molar 10A are disposed in the oral cavity for a long time and cannot be arbitrarily removed, which also causes inconvenience.

BRIEF SUMMARY OF THE INVENTION

In view of the aforementioned problems, an object of the invention is to provide a removable orthodontic correction device for pressing at least one tooth (such as the second molar of the maxillary dental arch) into the alveolar bone, which can improve the convenience of use.

In some embodiments of the invention, an orthodontic correction device is provided, including a first correction unit that is adapted to be removably worn on a dental arch. At least one first receiving part is formed in the first correction unit and configured to receive at least one first tooth of the dental arch which needs correction, wherein the shape of the first receiving part allows the first tooth to move toward the alveolar bone. At least one second receiving part is formed in the first correction unit and configured to receive at least one second tooth of the dental arch which does not need correction, wherein the shape of the second receiving part conforms to the shape of the second tooth and the second receiving part extends to the undercut area of the second tooth. At least one first opening is formed on a first occlusal surface of the first correction unit. The first opening is elongated and extends to a first lingual surface and a first buccal surface of the first correction unit which are opposite to each other. The position of the first opening corresponds to the position of the first tooth. The first opening exposes parts of the occlusal surface, the lingual surface, and the buccal surface of the first tooth. In addition, a force exerting assembly is configured to contact the first tooth through the first opening, thereby exerting a force on the first tooth to press the first tooth into the alveolar bone.

In some embodiments, the first opening extends in a first direction when viewed along a direction perpendicular to the first occlusal surface of the first correction unit. The first direction defines a direction in which the force presses the first tooth into the alveolar bone.

In some embodiments, the first opening extends in a second direction relative to the first occlusal surface and has a depth when viewed along a direction perpendicular to the first lingual surface or the first buccal surface of the first correction unit. The second direction defines a direction in which the force presses the first tooth into the alveolar bone. The depth of the first opening defines the depth to which the force presses the first tooth into the alveolar bone.

In some embodiments, the force exerting assembly includes a number of first connecting parts and an elastic member. The first connecting parts are respectively affixed to the first lingual surface and the first buccal surface of the first correction unit corresponding to the first opening. The elastic member is configured to stretch across the first occlusal surface of the first correction unit to couple with the first connecting parts and contact the first tooth through the first opening, thereby exerting a force on the first tooth to press the first tooth into the alveolar bone. The force is an elastic restoring force.

In some embodiments, the elastic member is a U-shaped structure having two side sections parallel to each other and a middle section connecting the side sections. The two side sections are respectively affixed to the first lingual surface and the first buccal surface of the first correction unit and each have a torsion spring portion. The middle section stretches across the first occlusal surface of the first correction unit and contacts the first tooth through the first opening.

In some embodiments, when viewed along a direction perpendicular to the first lingual surface or the first buccal surface of the first correction unit, the first opening extends in a second direction relative to the first occlusal surface. One of the first connecting parts is located on a side of the extension line of the first opening along the second direction. The two side sections of the elastic member each have a first segment, a second segment, and the torsion spring portion between the first segment and the second segment. The first segment is coupled to the first connecting part, and the second segment extends into the first opening and connects to the middle section of the elastic member.

In some embodiments, the orthodontic correction device further includes a protection element configured to cover a portion of the elastic member in the first opening to prevent the elastic member from directly contacting the first tooth. The protection element comprises an elastic material.

In some embodiments, the orthodontic correction device further includes a second correction unit adapted to be removably worn on the opposing dental arch. The second correction unit has a protrusion on a second occlusal surface of the second correction unit. The protrusion is configured to pass through a second opening on the first occlusal surface of the first correction unit to push the first tooth.

In some embodiments, the shape of the second opening corresponds to the shape of the protrusion when viewed along a direction perpendicular to the first occlusal surface.

In some embodiments, the second opening and the first opening partially overlap and have different shapes when viewed along a direction perpendicular to the first occlusal surface.

In some embodiments, the distal end of the second correction unit has an extending portion. The protrusion is formed on the extending portion, and the position of the protrusion corresponds to the positions of the second opening and the first tooth.

In some embodiments, the second correction unit exposes the occlusal surface of teeth of the other dental arch. The second correction unit further includes a limiting member having elasticity. The limiting member is movably coupled to a number of second connecting parts formed on a second lingual surface and a second buccal surface of the second correction unit which are opposite to each other, stretches across the occlusal surface of the teeth of the other dental arch, and extends to the undercut area of the teeth, thereby enhancing the retention of the second correction unit on the opposing dental arch.

In some embodiments, an orthodontic correction unit is also provided, including a correction unit that is adapted to be removably worn on a dental arch. At least one protrusion is disposed on the occlusal surface of the correction unit. The position of the protrusion corresponds to the position of at least one first tooth, which needs correction, of the opposing dental arch. The protrusion is configured to press the first tooth into the alveolar bone.

In some embodiments, the distal end of the correction unit has an extending portion, and the protrusion is formed on the occlusal surface of the extending portion.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
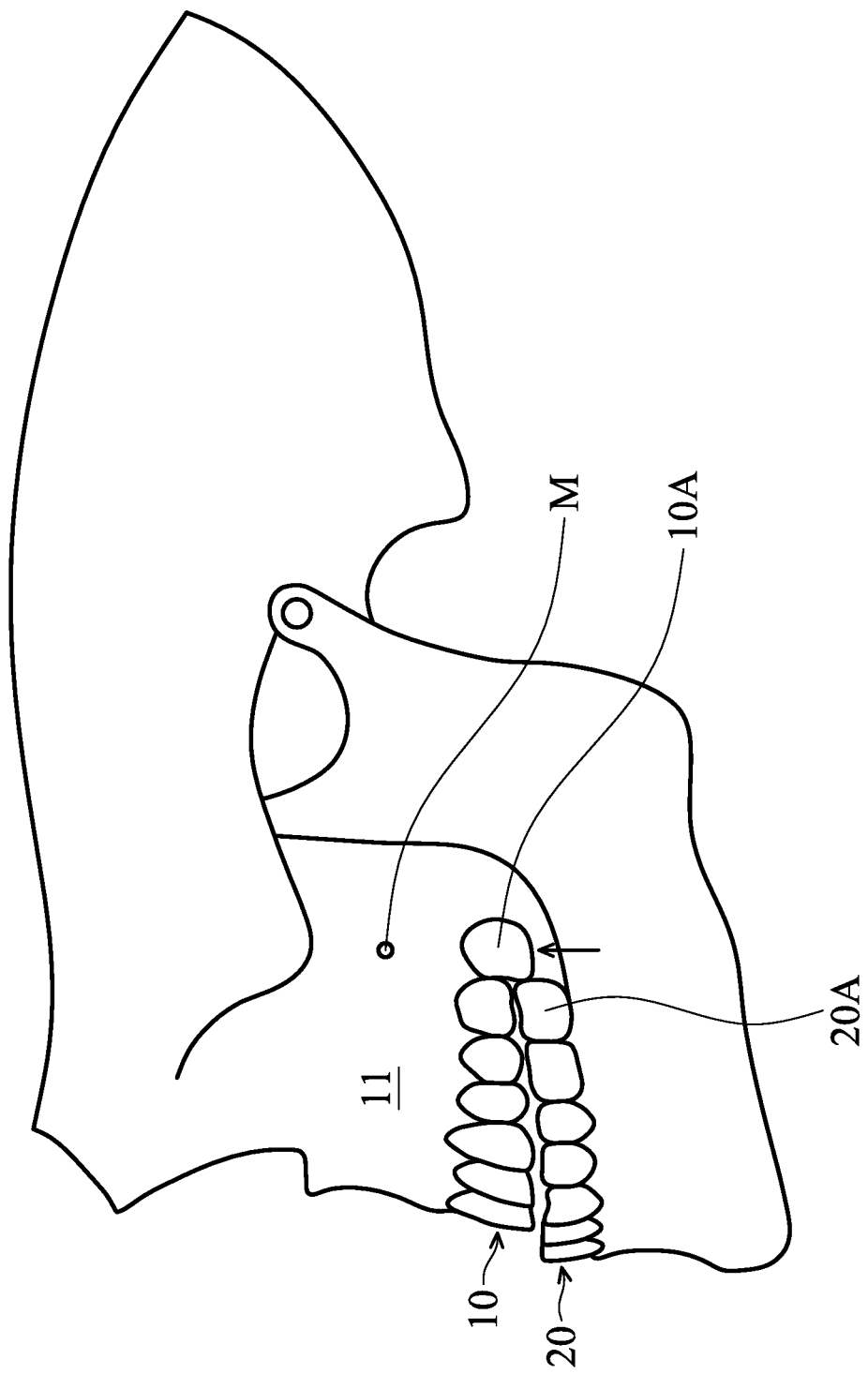
FIG. 1 is a schematic view illustrating that the second molar of the maxillary dental arch of the patient is excessively elongated.

The following disclosure provides many different embodiments, or examples, for implementing different features of the invention. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact.

In the following detailed description, spatially relative terms, such as "on", "above", "under", "below", "left" and "right" are used for representing the relationship between the relative positions of each element as illustrated in the drawings, and are not meant to limit the invention. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

In addition, the present disclosure may repeat reference numerals and/or letters in the various examples. This repetition is for the purpose of simplicity and clarity and does not in itself dictate a relationship between the various embodiments and/or configurations discussed. Various features may be arbitrarily drawn in different scales for the sake of simplicity and clarity. Furthermore, some elements not shown or described in the embodiments have the forms known by persons skilled in the field of the invention.

Figure 2:
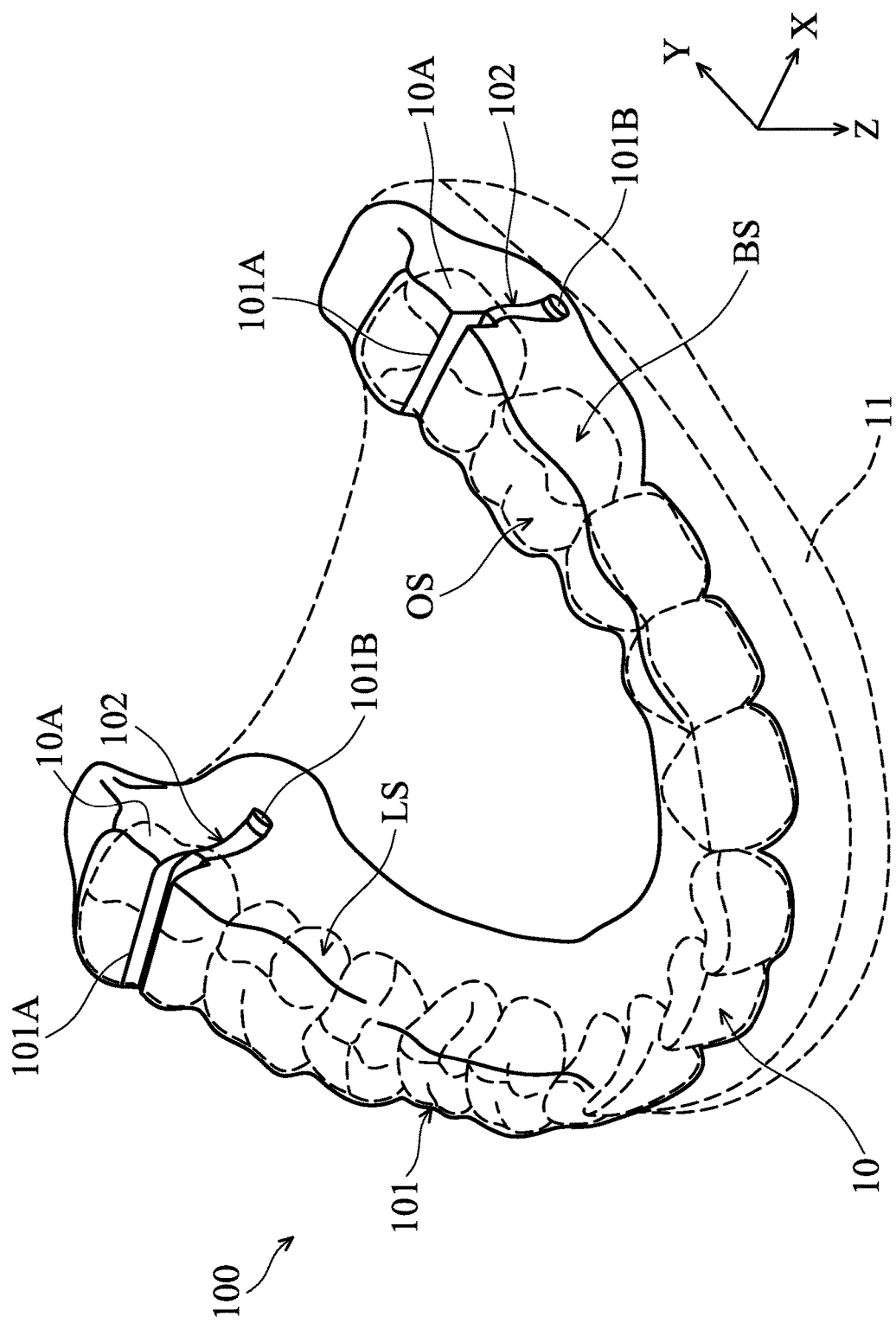
FIG. 2 is a schematic perspective view of an orthodontic correction device in accordance with some embodiments.

Referring to FIG. 2, which is a schematic perspective view of an orthodontic correction device 100 in accordance with some embodiments. The orthodontic correction device 100 is a removable orthodontic correction device that can be used, for example, to press the second molar 10A of the maxillary dental arch 10 (see also FIG. 4) of the patient into the alveolar bone. The orthodontic correction device 100 includes a correction unit 101 (first correction unit) that is adapted to be removably worn on the maxillary dental arch 10, so that the patient can freely wear or remove the correction unit 101 according to the occasion and needs, and can clean teeth normally (convenient to use).

In accordance with some embodiments, the material used to form the correction unit 101 may comprise thermoplastic, orthodontic resin, or other materials suitable for use in the oral cavity. It should be understood that the correction unit 101 can be made by manufacturing methods well-known to those skilled in the art, and the present disclosure does not limit the method of making the correction unit 101.

In accordance with some embodiments, the structural strength of the correction unit 101 can withstand the occlusal force generated during normal mastication without deformation or breakage. The structural strength of the correction unit 101 may be improved, for example, by increasing the thickness of the correction unit 101, changing the material of the correction unit 101, or forming the correction unit with a multi-layer material.

Figure 3:
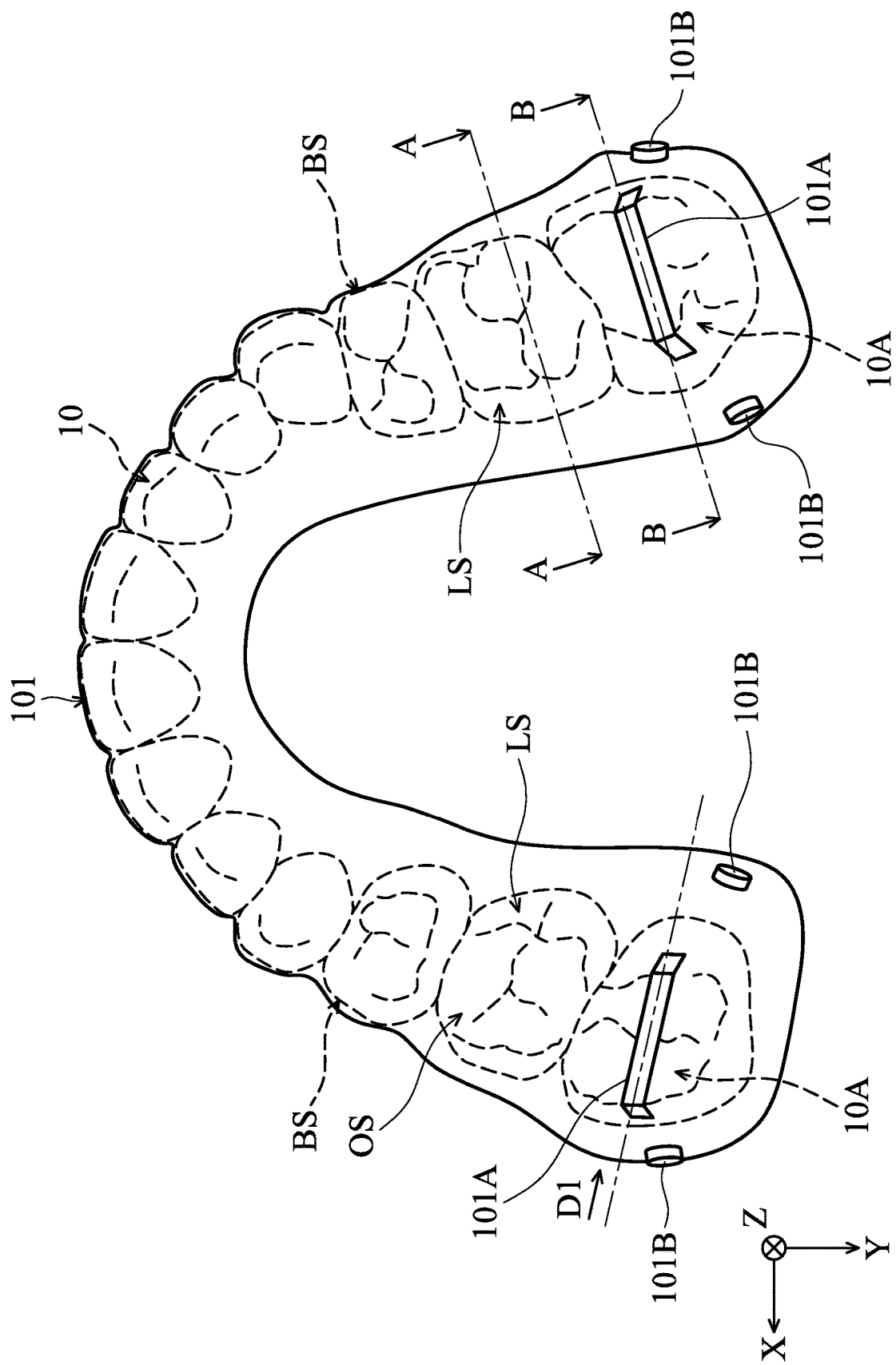
FIG. 3 is a schematic view of the first correction unit in FIG. 2 when viewed along a direction perpendicular to the occlusal surface thereof.
Figure 4:
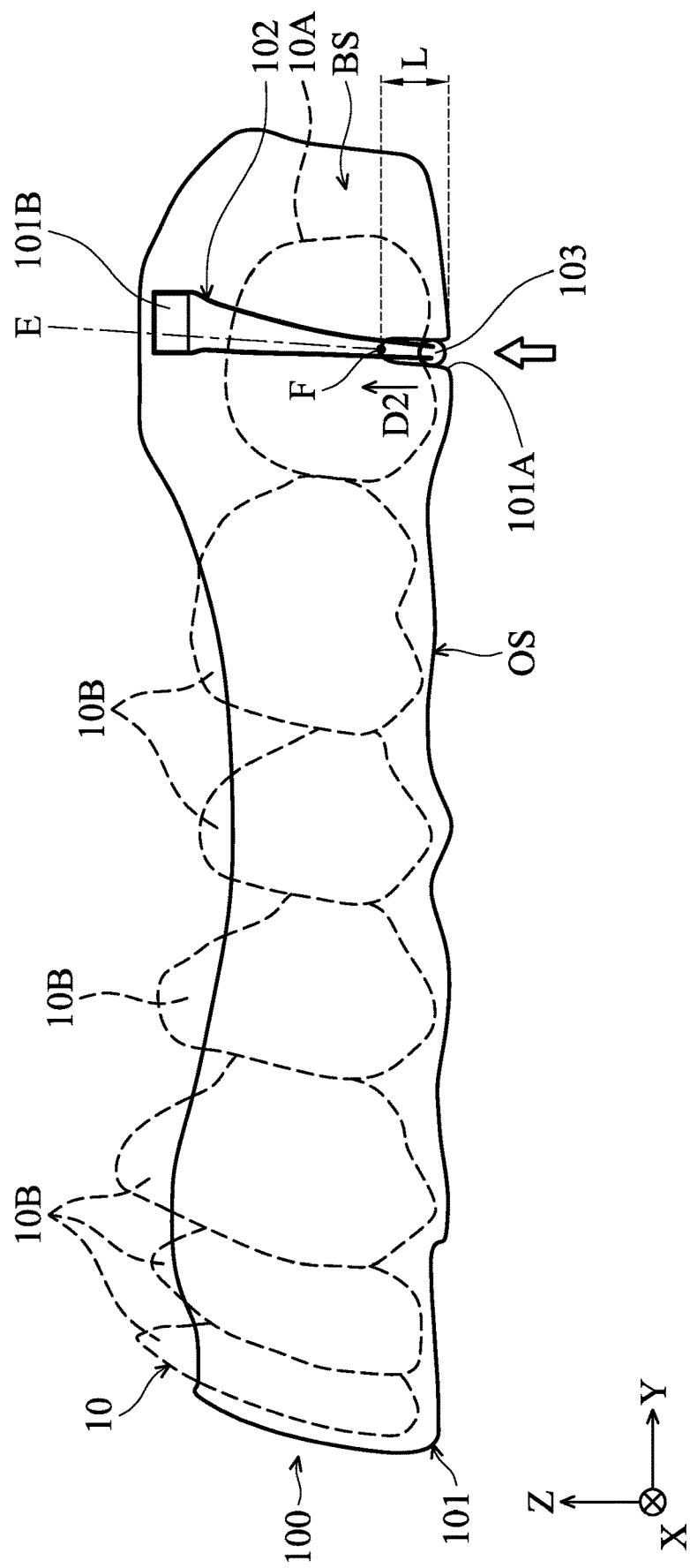
FIG. 4 is a schematic view illustrating the correction mechanism of the orthodontic correction device in FIG. 2.

Referring to FIG. 2 and FIG. 3, the correction unit 101 has two elongated openings 101A (first openings) configured to expose two second molars 10A on the left and right sides of the maxillary dental arch 10 (that is, the positions of the two openings 101A correspond to the positions of the two second molars 10A, respectively). More specifically, each of the openings 101A is formed on the occlusal surface OS (first occlusal surface) of the correction unit 101 and extended (in a first direction D1) to the lingual surface LS (first lingual surface) and the (left or right) buccal surface BS (first buccal surface) of the correction unit 101 which are opposite to each other. Also, as shown in FIG. 4, the opening 101A may extend in a second direction D2 (for example, the Z-direction shown in the figure) relative to the occlusal surface OS and have a depth L when viewed along a direction perpendicular to the lingual surface LS or buccal surface BS of the correction unit 101. Accordingly, the opening 101A can expose parts of the occlusal surface, the lingual surface, and the buccal surface of the second molar 10A (when viewed along a direction perpendicular to the occlusal surface OS, a direction perpendicular to the lingual surface LS, and a direction perpendicular to the buccal surface BS of the correction unit 101).

In accordance with some embodiments, a number of connecting parts 101B (for example, hook structures) are respectively formed on the lingual surface LS and buccal surface BS of the correction unit 101, and the positions of the connecting parts 101B correspond to the positions of the openings 101A. More specifically, for each opening 101A, two connecting parts 101B (first connecting parts) are respectively affixed to the lingual surface LS and buccal surface BS of the correction unit 101 and correspond to both ends of the long axis of the opening 101A (see FIG. 3). The position of each connecting part 101B on the lingual surface LS or buccal surface BS of the correction unit 101 is away from the occlusal surface OS and the opening 101A (see FIG. 4). In accordance with some embodiments, the material of the connecting part 101B may comprise stainless steel, nickel titanium alloy, resin, or plastic ceramic, and the connecting part 101B can be affixed to the correction unit by, for example, an adhesive. Alternatively, the connecting part 101B and the correction unit 101 can be integrally formed and have the same material.

In the embodiments illustrated in FIG. 2, the orthodontic correction device 100 also includes two elastic members 102, such as rubber rings or spring coils made of nickel titanium alloy. The two elastic members 102 are configured on the correction unit 101 to correspond to the two openings 101A and the two second molars 10A of the maxillary dental arch 10, respectively. Each of the elastic members 102 is configured to stretch across the occlusal surface OS of the correction unit 101 to couple with the two connecting parts 101B on the lingual surface LS and buccal surface BS of the correction unit 101. In accordance with some embodiments, when viewed along a direction perpendicular to the lingual surface LS or buccal surface BS of the correction unit 101 (see FIG. 4), the connecting part 101B is located on an extension line E of the opening 101A along the second direction D2, and the elastic member 102 is disposed substantially parallel to the extension line E of the opening 101A.

Furthermore, the elastic member 102 can contact the second molar 10A through the opening 101A, thereby exerting an (elastic) force on the second molar 10A to press the second molar 10A into the alveolar bone (as indicated by the arrow in FIG. 4). It should be understood that when the correction unit 101 is worn on the maxillary dental arch 10 of the patient (see FIG. 4), the second molar 10A (first tooth) that is excessively elongated and needs correction will stretch the elastic member 102, confined in the opening 101A, downward to deform it. When the elastic member 102 gradually returns to its original shape, it can generate an elastic restoring force (i.e., the above-mentioned force) to press the second molar 10A upward into the alveolar bone, so as to achieve the purpose of correction. The elastic member 102 and the connecting parts 101B constitute a force exerting assembly of the orthodontic correction device 100.

Figure 5:
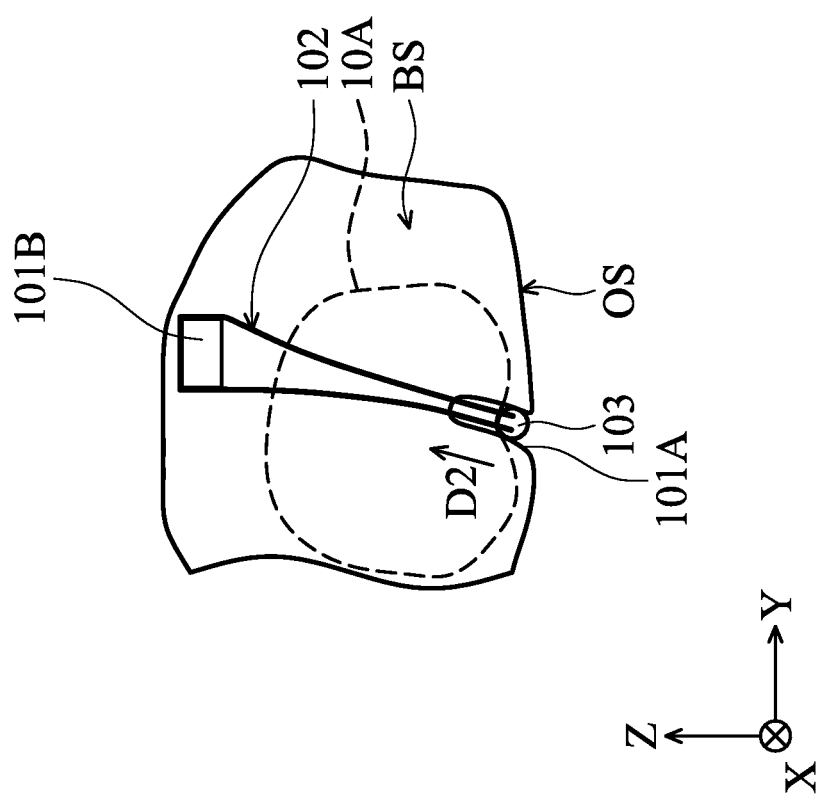
FIG. 5 is a partial enlarged view of an orthodontic correction device in accordance with some embodiments.

Note that, since the elastic member 102 is confined in the opening 101A, the extension direction (second direction D2) of the opening 101A formed on the lingual surface LS or buccal surface BS of the correction unit 101 can define the direction in which the (elastic) force of the elastic member 102 presses the second molar 10A into the alveolar bone. For example, when the second direction D2 is substantially vertically upward with respect to the occlusal surface OS (see FIG. 4), the elastic member 102 can press the second molar 10A upward into the alveolar bone along the opening 10A. When the second direction D2 is inclined toward a specific direction with respect to the occlusal surface OS (i.e., non-parallel to the Z-direction, as shown in FIG. 5), the elastic member 102 can press the second molar 10A into the alveolar bone in the specific direction along the opening 10A. Similarly, the extension direction (first direction D1) of the opening 101A formed on the occlusal surface OS of the correction unit 101 can also define the direction in which the (elastic) force of the elastic member 102 presses the second molar 10A into the alveolar bone. The direction in which the opening 101A extends (i.e., the first and second directions D1 and D2) can be configured according to the patient's correction needs.

In addition, the depth L of the opening 101A can define the depth in which the elastic force of the elastic member 102 presses the second molar 10A into the alveolar bone. For example, when the elastic member 102 moves along the sidewall(s) of the opening 101A to the end F (see FIG. 4) of the opening 101A, it is restricted by the structure of the opening 101A and cannot continue to move. Therefore, the depth L of the opening 101A determines the maximum depth in which the elastic force of the elastic member 102 presses the second molar 10A into the alveolar bone and can avoid excessive movement of the second molar 10A. The depth L of the opening 101A can be configured or adjusted according to the correction needs of the patient.

Figure 6A:
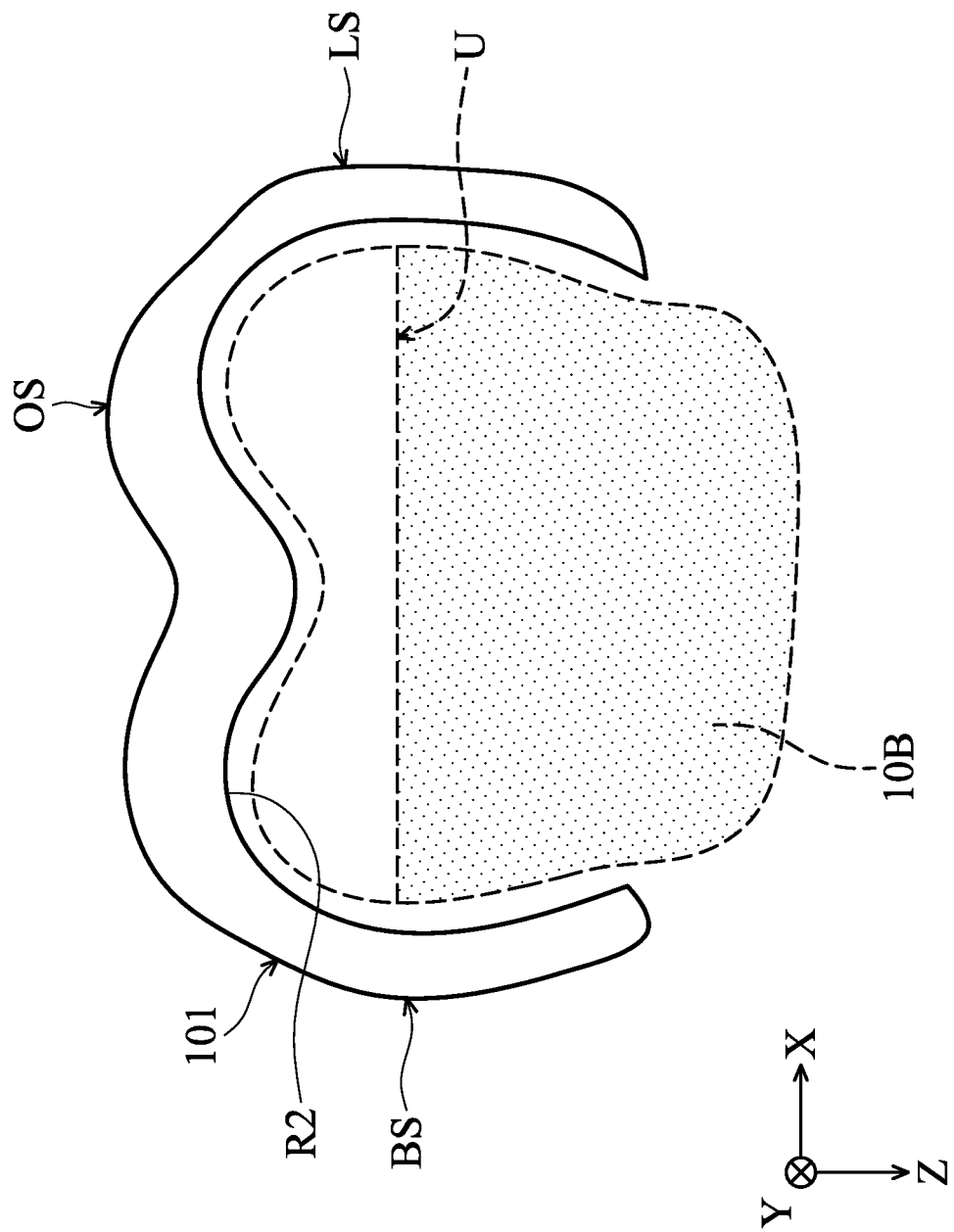
FIG. 6A is a cross-sectional view taken along line A-A in FIG. 3.
Figure 6B:
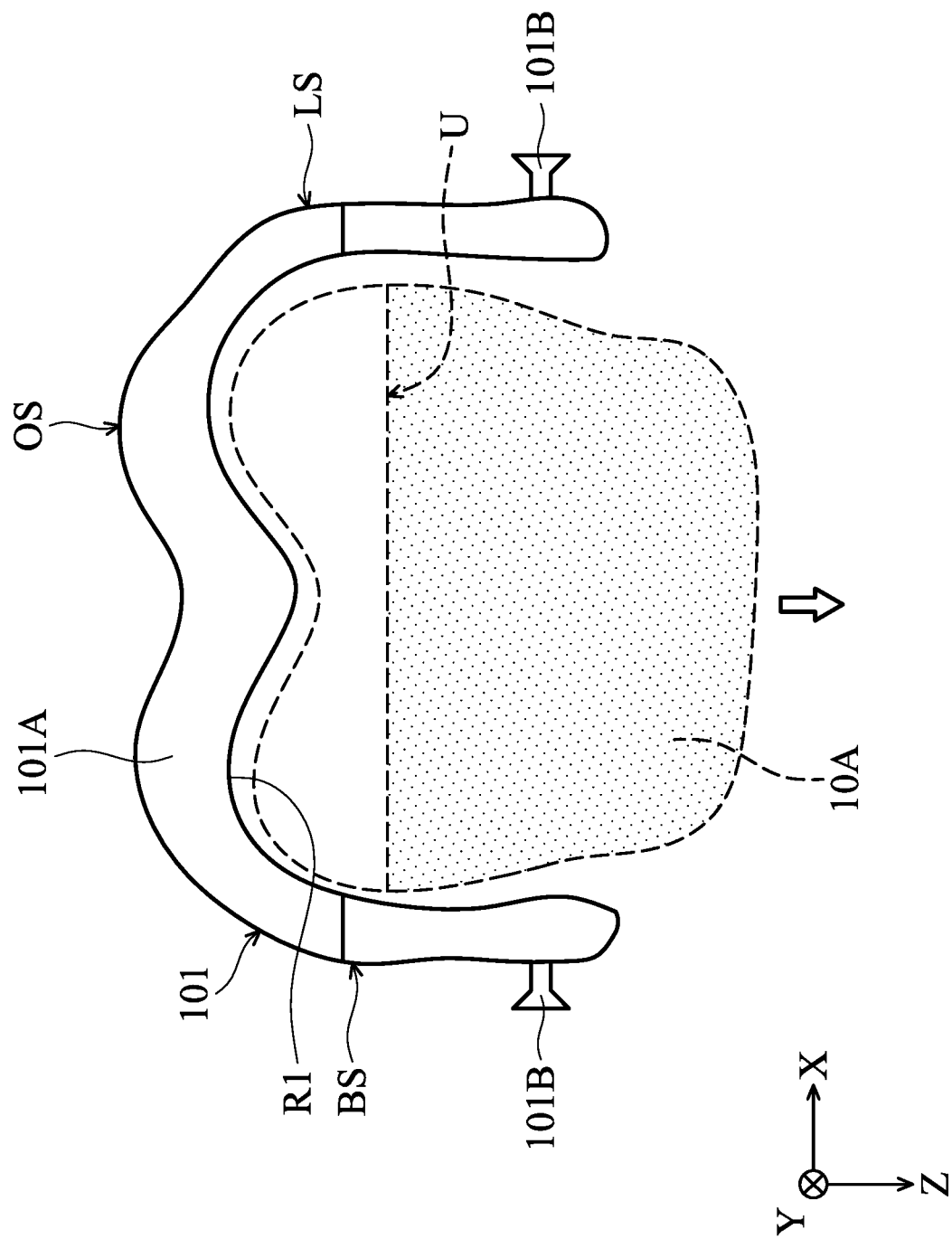
FIG. 6B is a cross-sectional view taken along line B-B in FIG. 3.

Referring to FIGS. 3, 4, 6A and 6B, a number of tooth receiving cavities are formed on the inner side of the correction unit 101 opposite to the occlusal surface OS, and configured to receive the teeth of the maxillary dental arch 10. In accordance with some embodiments, the correction unit 101 includes at least one tooth receiving part R1 (first receiving part) for accommodating at least one first tooth 10A (such as the second molar 10A) which requires correction. The tooth receiving part R1 is configured to allow the second molar 10A to move toward the alveolar bone (as indicated by the arrow in FIG. 6B). More specifically, the shape of the tooth receiving part R1 is designed to allow the second molar 10A to move in the direction of the pressing force. For example, (subject to the direction of pressing)

starting from the undercut area defined by the connecting line of the most prominent points of the tooth, the tooth receiving part R1 reserves enough space to allow the second molar 10A to smoothly move toward the alveolar bone under the driving force of the elastic member 102 without being blocked by the tooth receiving part R1. As shown in FIG. 6B, the area below an undercut line U (i.e., a virtual line representing the widest portion of the second molar 10A) of the second molar 10A is the undercut area (indicated by the dots) of the second molar 10A.

Moreover, the correction unit 101 also includes at least one tooth receiving part R2 (second receiving part) for accommodating at least one second tooth 10B (for example, teeth other than the second molar 10A) that does not need correction. The tooth receiving part R2 is configured or designed to conform to the shape of the second tooth 10B (for example, closely fitting the second tooth) and extend to the undercut area of the second tooth 10B (i.e., covering almost the entire crown of the second tooth 10B). Therefore, it can increase the retention of the correction unit 101 to the maxillary dental arch 10 and prevent the correction unit 101 from being easily detached from the maxillary dental arch 10 during the correction process (i.e., improve the stability of the orthodontic correction device 100 in use).

Figure 10:
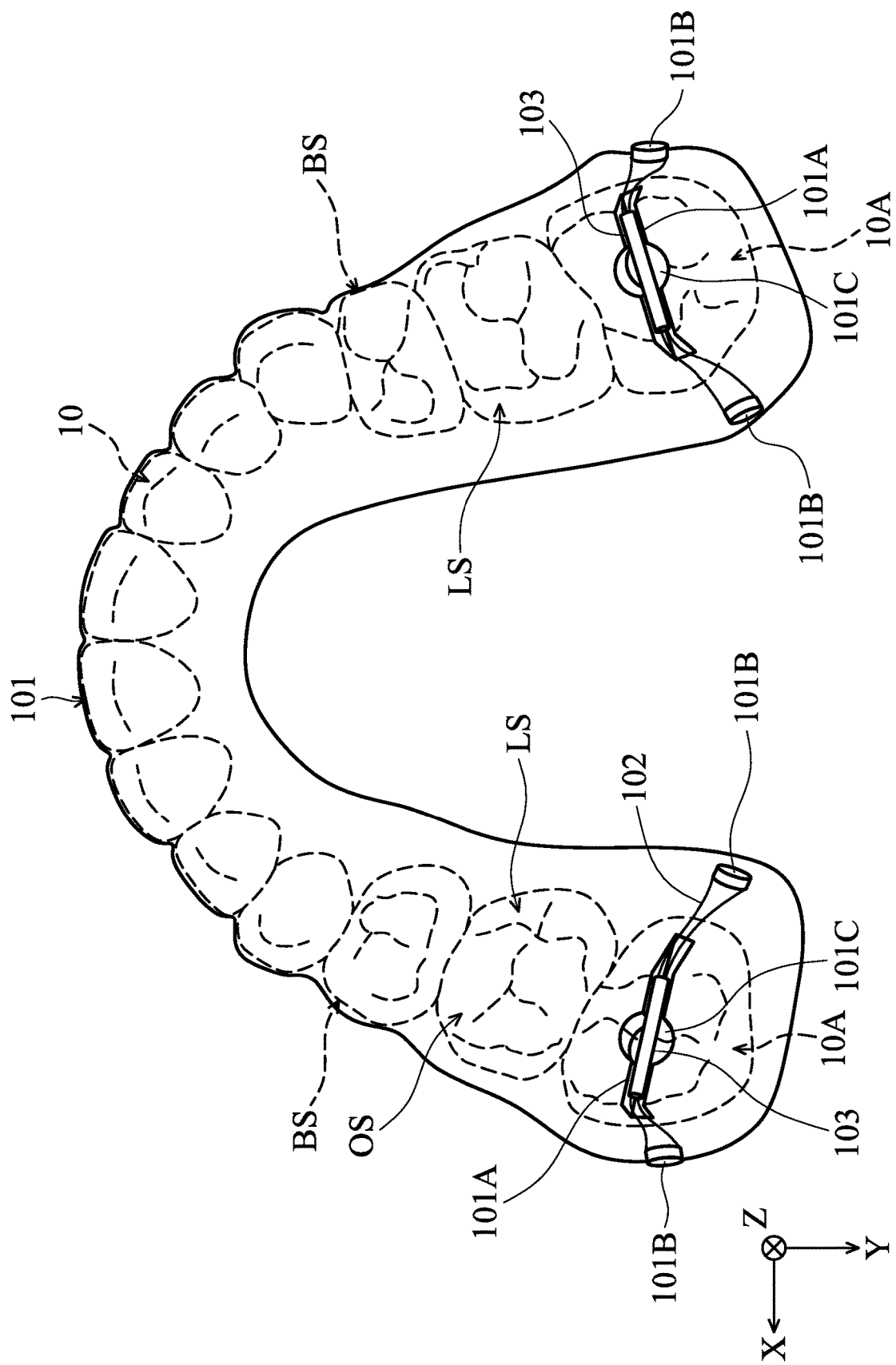
FIG. 10 is a schematic view of the orthodontic correction device in FIG. 9 when viewed along a direction perpendicular to the occlusal surface of the first correction unit.

Referring to FIG. 4, the orthodontic correction device 100 may also include at least one protection element 103 (see also FIG. 10). The protection element 103 is configured to cover a portion of the elastic member 102 across the occlusal surface OS of the correction unit 101 and in the opening 101A, so as to prevent the elastic member 102 from directly contacting the second molar 10A and reduce damage to the second molar 10A. In accordance with some embodiments, the protection element 103 can be a tubular structure having a length less than or equal to the length of the opening 101A. The protection element 103 may comprise an elastic material, such as resin, rubber or the like.

Figure 7:
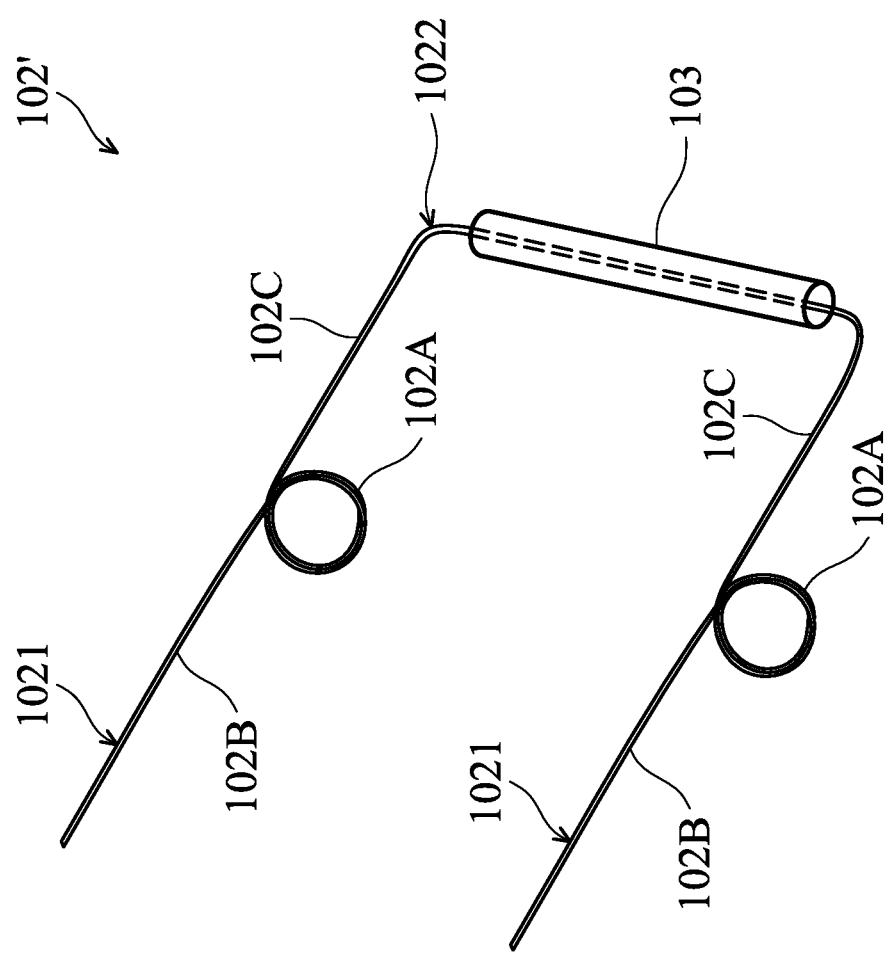
FIG. 7 is a schematic perspective view of an elastic member in accordance with some embodiments.
Figure 8:
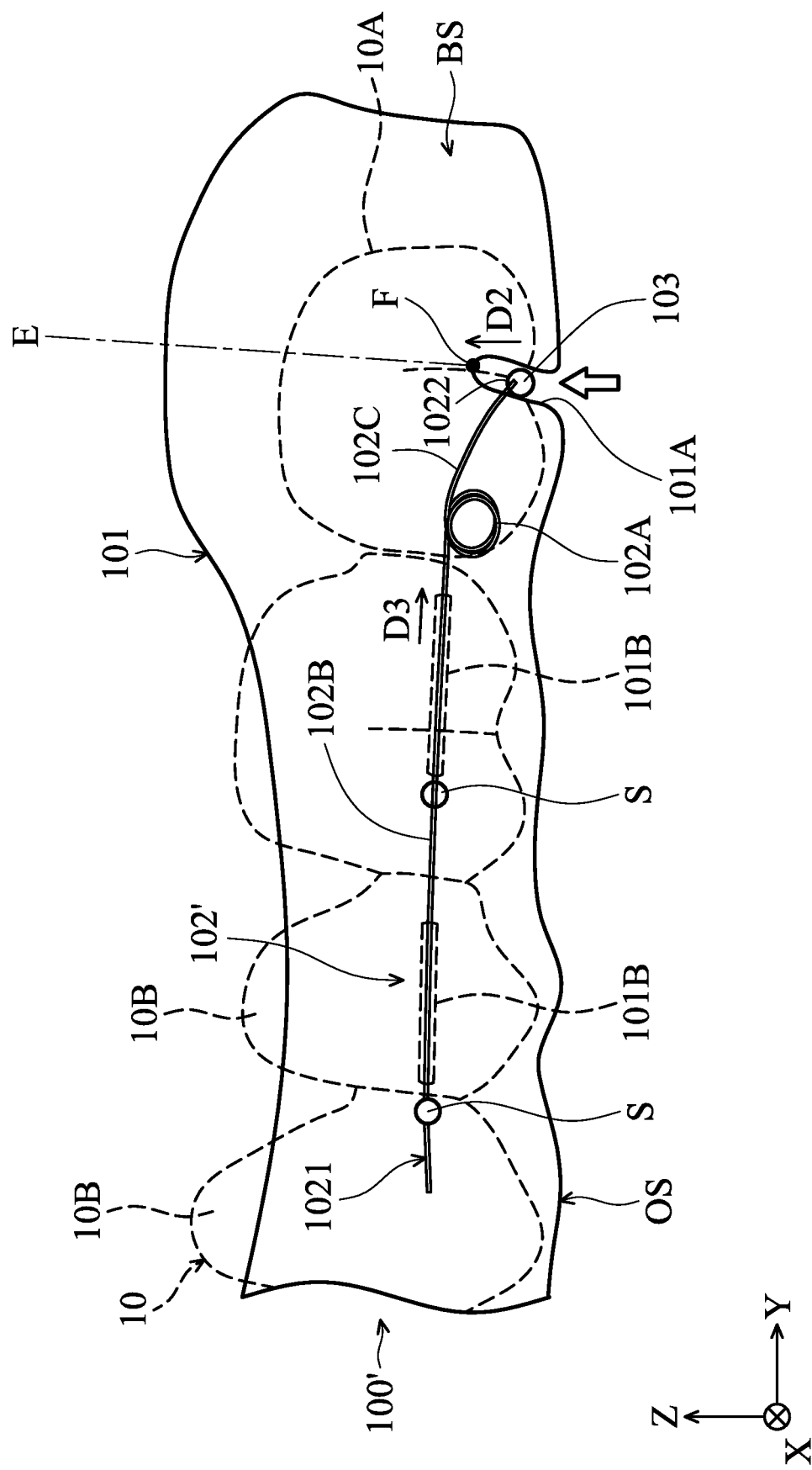
FIG. 8 is a schematic view of an orthodontic correction device including the elastic member in FIG. 7, in accordance with some embodiments.

Referring to FIG. 7 and FIG. 8, an orthodontic correction device 100' according to some other embodiments may include elastic members 102' of different structural types (e.g., metal wires). As in the above embodiments, an elastic member 102' is provided for each opening 101A in the correction unit 101. Each elastic member 102' is substantially a U-shaped structure having two side sections 1021 parallel to each other and a middle section 1022 connecting the two side sections 1021. The two side sections 1021 can be respectively disposed on or affixed to the opposite lingual surface LS and buccal surface BS of the correction unit 101 (only one side section 1021 of the elastic member 102' disposed on the buccal surface BS can be seen in FIG. 8 due to viewing angle limitations) and each has a torsion spring portion 102A. The middle section 1022 can be configured to span across the occlusal surface OS of the correction unit 101 and contact the second molar 10A of the maxillary dental arch 10, thereby generating an (elastic) force to press the second molar 10A into the alveolar bone (as indicated by the arrow in FIG. 8).

In the embodiments illustrated in FIGS. 7 and 8, at least one connecting part 101B is affixed to the correction unit 101 when viewed along a direction perpendicular to the lingual surface LS or the buccal surface BS of the correction unit 101. The connecting part 101B is a tubular structure made of, for example, a metal or a plastic material having sufficient strength, and can be affixed to the lingual surface LS or the buccal surface BS of the correction unit 101 by, for example, an adhesive. Moreover, when viewed along the direction perpendicular to the lingual surface LS or the buccal surface BS of the correction unit 101, the tubular connecting part 101B is located on a side of an extension line E of the opening 101A along its extension direction (second direction D2), and the connecting part 101B is arranged in parallel to a third direction D3 different from the second direction D2.

Referring to FIG. 8, when viewed along the direction perpendicular to the lingual surface LS or the buccal surface BS of the correction unit 101, one side section 1021 of the elastic member 102' has a first segment 102B, a second segment 102C, and the torsion spring portion 102A between the first segment 102B and the second segment 102C. The first segment 102B is configured to pass through and couple with the above connecting part 101B. The second segment 102C is configured to extend into the opening 101A to connect the middle section 1022 of the elastic member 102' (U-shaped structure).

The first segment 102B may also have at least one stopper S configured to prevent the first segment 102B from sliding with respect to the connecting part 101B. For example, the stopper S can be a spherical structure having a diameter greater than the inner diameter of the tubular connecting part 101B so as to be unable to enter the connecting part 101B. Accordingly, the stopper S can limit the movement of the first segment 102B relative to the connecting part 101B.

With the above configuration, when the correction unit 101 of the orthodontic correction device 100' is not worn on the maxillary dental arch 10 of the patient, the two side sections 1021 of the elastic member 102' are in a state substantially parallel to the third direction D3, and the middle section 1022 of the elastic member 102 contacts the end F of the opening 101A. When the correction unit 101 is worn on the maxillary dental arch 10 of the patient, the second molar 10A (first tooth) that is excessively elongated and needs correction, will push the middle section 1022 (FIG. 7) of the elastic member 102' in the opening 101A downward to deform the second segments 102C of the two side sections 1021 (see FIG. 8). Similar to the above embodiments illustrated in FIG. 4, when the elastic member 102' gradually returns to its original shape, it can generate an elastic restoring force to press the second molar 10A upward into the alveolar bone, so as to achieve the purpose of correction.

In accordance with some embodiments, the elastic member 102' may be made of a shape-memory alloy (SMA) material such as a nickel-titanium alloy or the like. The SMA material can be deformed at a lower temperature and restored to its remembered shape when the temperature is raised (for example, due to heat conduction after contact with the teeth). In accordance with some embodiments, the elastic member 102' may also comprise a stainless steel material.

In the embodiments illustrated in FIGS. 7 and 8, the orthodontic correction device 100' may also include at least one protection element 103 (the same as the protection element 103 in FIG. 4). The protection element 103 is configured to cover the middle section 1022 of the elastic member 102' across the occlusal surface OS of the correction unit 101 and confined in the opening 101A, so as to prevent the elastic member 102' from directly contacting the second molar 10A and reduce damage to the second molar 10A.

Figure 9:
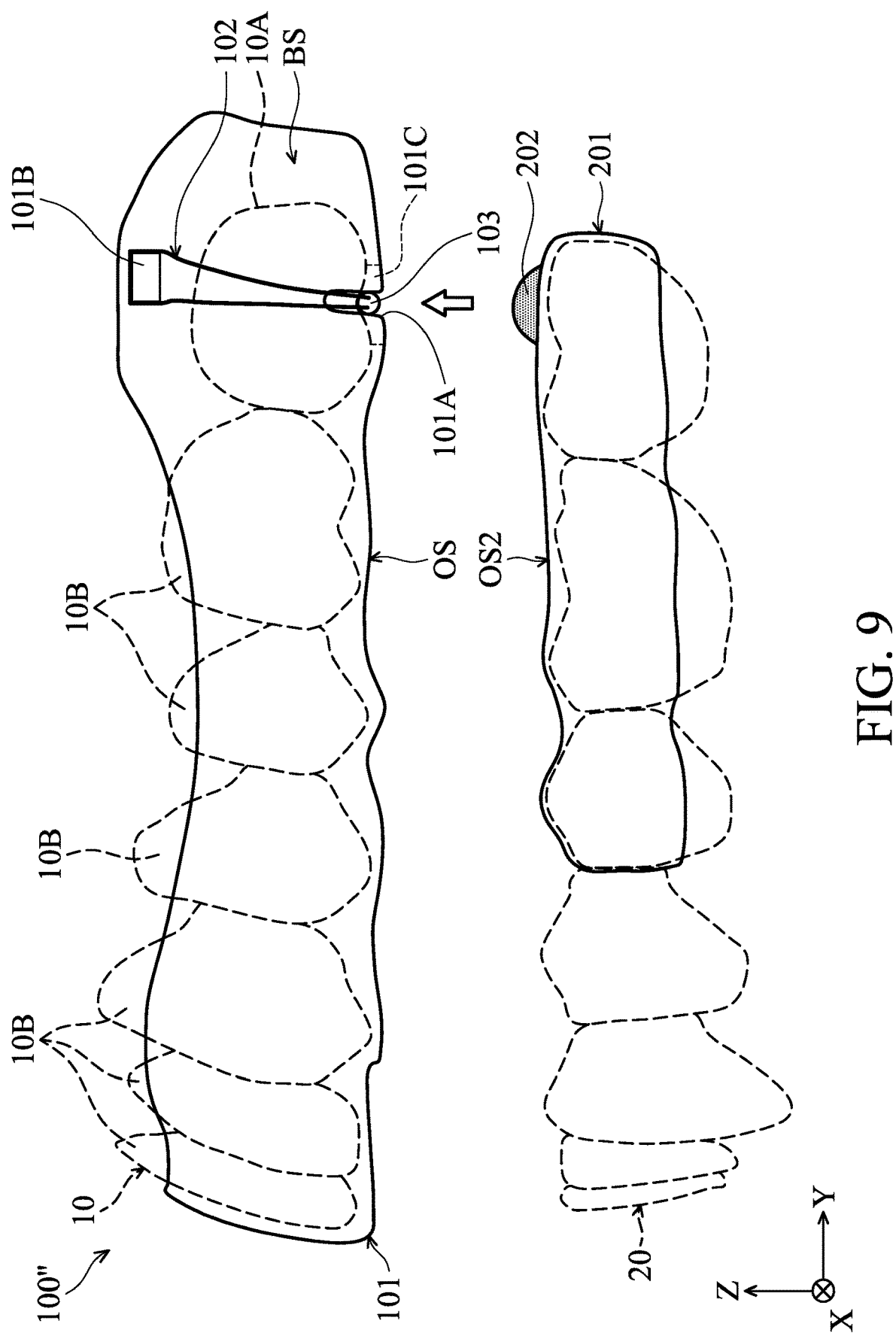
FIG. 9 is a schematic view of an orthodontic correction device in accordance with some embodiments.

FIG. 9 is a schematic view of an orthodontic correction device 100" in accordance with some other embodiments. The orthodontic correction device 100" differs from the orthodontic correction device 100 illustrated in FIGS. 2 to 5 in that the orthodontic correction device 100" further includes a correction unit 201 (second correction unit)

adapted to be removably worn on the mandibular dental arch 20 of the patient. The second correction unit 201 may have the same or similar material as the first correction unit 101. In accordance with some embodiments, the structural strength of the first correction unit 101 and the second correction unit 201 can withstand the occlusal force generated during normal mastication without deformation or breakage.

In the embodiments illustrated in FIG. 9, the second correction unit 201 is worn on a part of the teeth of the mandibular dental arch 20. However, the second correction unit 201 can also be worn on all teeth of the mandibular dental arch 20. Similarly, the first correction unit 101 in various embodiments of the present disclosure can also be worn on all or part of the teeth of the maxillary dental arch 10, as long as the first tooth 10A needing correction is covered.

As shown in FIG. 9 and FIG. 10, the occlusal surface OS2 (second occlusal surface) of the second correction unit 201 has two protrusions 202 (only one protrusion 202 can be seen in FIG. 9 due to viewing angle limitations), and the first occlusal surface OS of the first correction unit 101 also has two openings 101C (second openings) corresponding to the protrusions 202. With the above configuration, when the patient wear the orthodontic correction device 100", the elastic member 102 can pass through the (first) opening 101A of the first correction unit 101 and exert an elastic force on the first tooth 10A (e.g., second molar 10A) of the maxillary dental arch 10 to press the first tooth 10A into the alveolar bone (the same as the embodiments of FIGS. 2 to 5). In addition, the protrusions 202 on the second occlusal surface OS2 of the second correction unit 201 can also pass through the second openings 101C on the first occlusal surface OS of the first correction unit 101 to push the first teeth 10A by the occlusal force, so that the correction efficiency can be further improved.

In accordance with some embodiments, the second opening 101C and the first opening 101A partially overlap and have different shapes (for example, the second opening 101C is a circular structure corresponding to the shape of the protrusion 202, and the first opening 101A is an elongated structure) when viewed along a direction perpendicular to the first occlusal surface OS of the first correction unit 101 (see FIG. 10). However, the second opening 101C and the first opening 101A may also have the same or similar shapes (both are elongated structures), and the difference therebetween is that the size of the second opening 101C can allow the protrusion 202 of the second correction unit 201 to pass through. In some alternative embodiments, the second opening 101C and the first opening 101A may also not overlap.

In accordance with some embodiments, the elastic member 102 on the first correction unit 101 of the orthodontic correction device 100' can also be replaced by the elastic member 102' illustrated in FIGS. 7 and 8 to achieve a similar correction effect.

Figure 11:
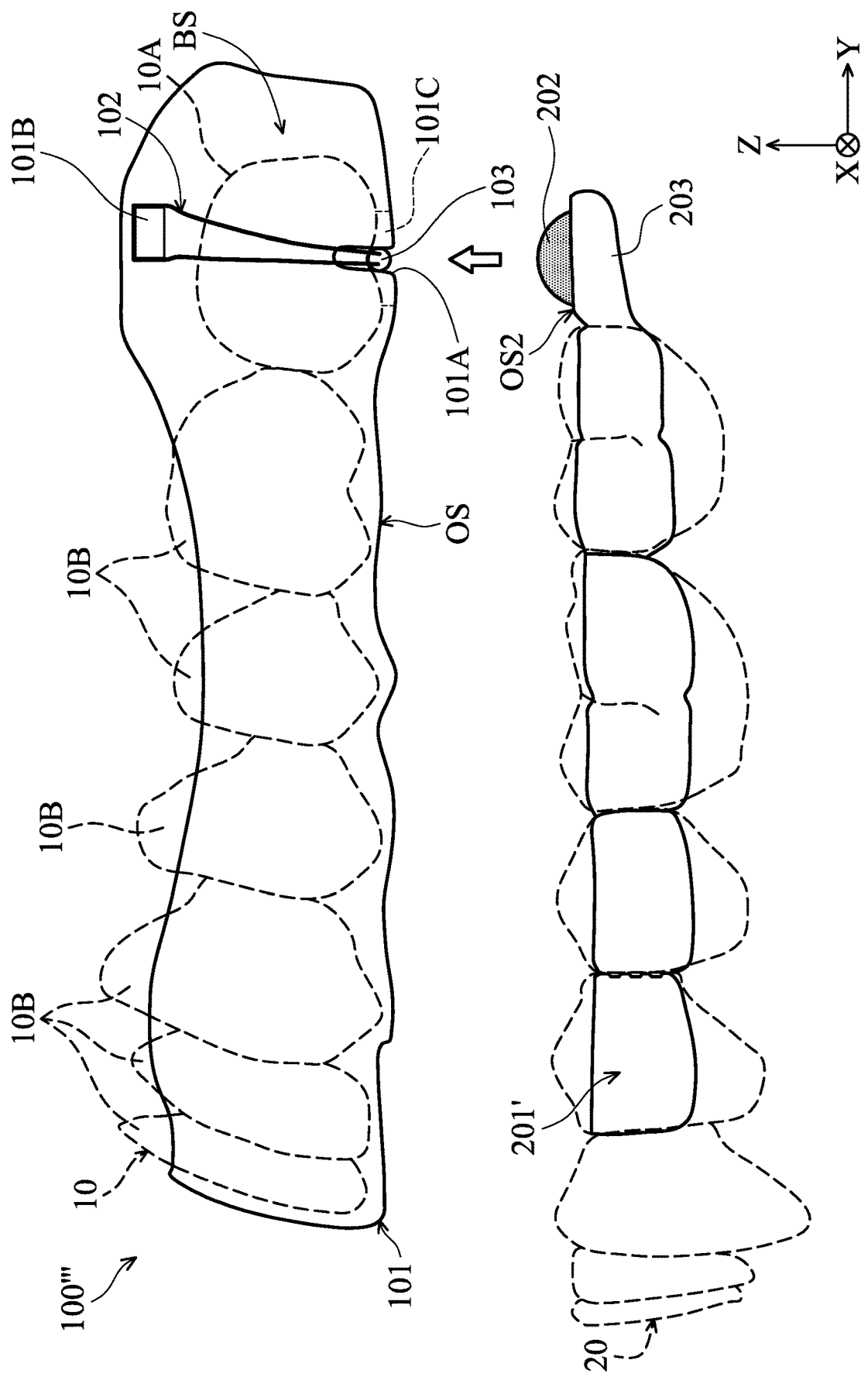
FIG. 11 is a schematic view of an orthodontic correction device in accordance with some embodiments.
Figure 12:
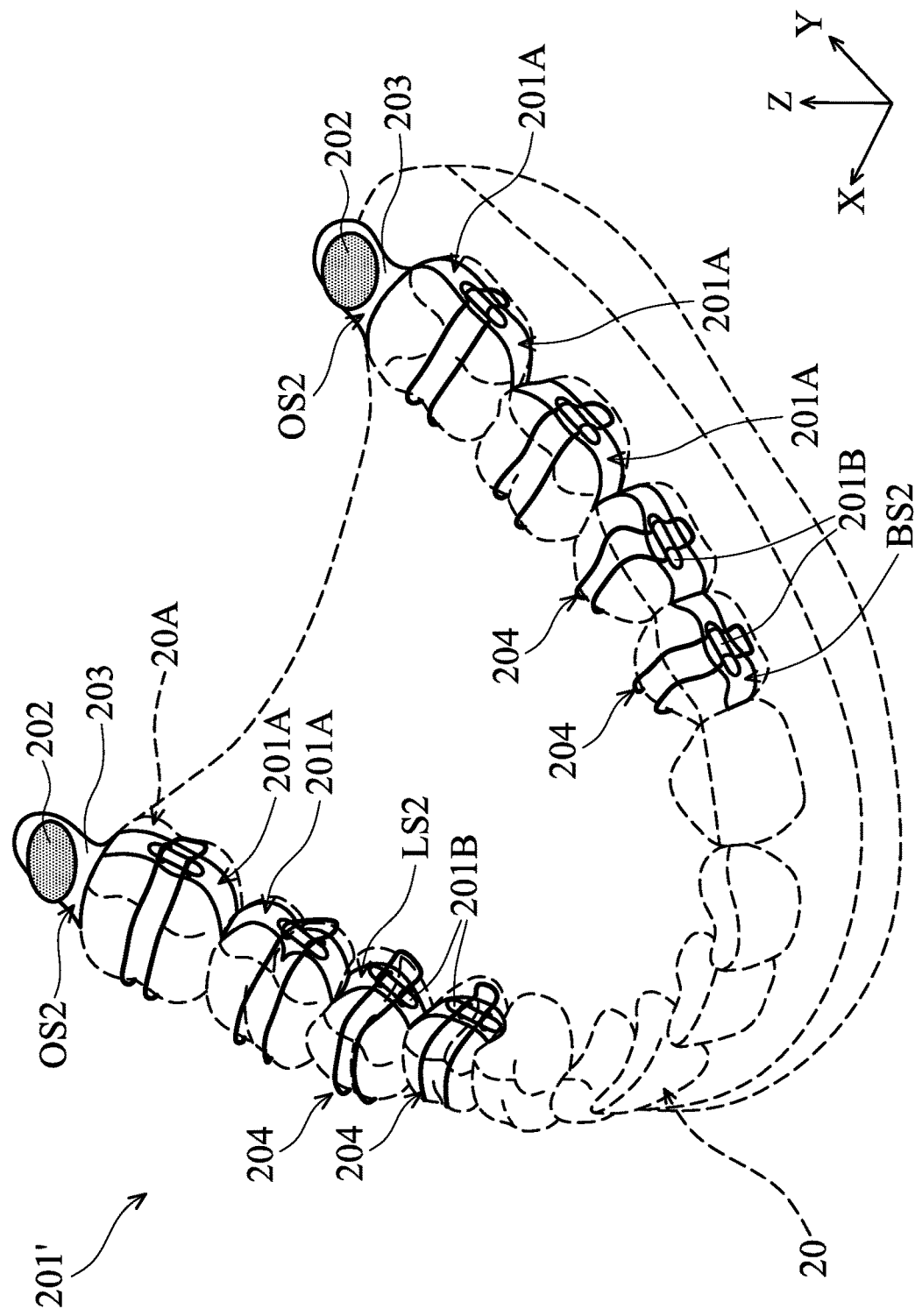
FIG. 12 is a schematic perspective view of the second correction unit in FIG. 11.

Referring to FIG. 11 and FIG. 12, wherein FIG. 11 is a schematic view of an orthodontic correction device 100''' in accordance with some other embodiments, and FIG. 12 is a schematic perspective view of the second correction unit 201' in FIG. 11. The orthodontic correction device 100''' differs from the orthodontic correction device 100" illustrated in FIGS. 9 and 10 in that the second correction unit 201' of the orthodontic correction device 100''' is formed by metal casting (but not limited thereto, it can also be made of other materials that can be used) and includes a number of tooth receiving parts 201A respectively worn on a part of the teeth of the mandibular dental arch 20. As shown in FIGS. 11 and 12, the tooth receiving parts 201A are configured to surround peripheral surfaces (such as the lingual surface and the buccal surface) of part of the teeth of the mandibular dental arch 20 and expose the occlusal surface of the teeth. In addition, two distal ends of the second correction unit 201' respectively have an extending portion 203. The occlusal surface OS2 (second occlusal surface) of each extending portion 203 has a protrusion 202 protruding toward the first correction unit 101. The positions of the protrusions 202 correspond to the positions of the second openings 101C (see FIG. 10) on the first correction unit 101 and the first teeth 10A. In accordance with some embodiments, the second correction unit 201' and the protrusions 202 can be integrally formed.

With the above design, the orthodontic correction device 100''' can also achieve the same correction effect as the orthodontic correction device 100" illustrated in FIGS. 9 and 10. In some other embodiments, the first correction unit 101 may also be omitted, and the first teeth 10A are pressed into the alveolar bone only by wearing the second correction unit 201' and using the protrusions 202.

Figure 13:
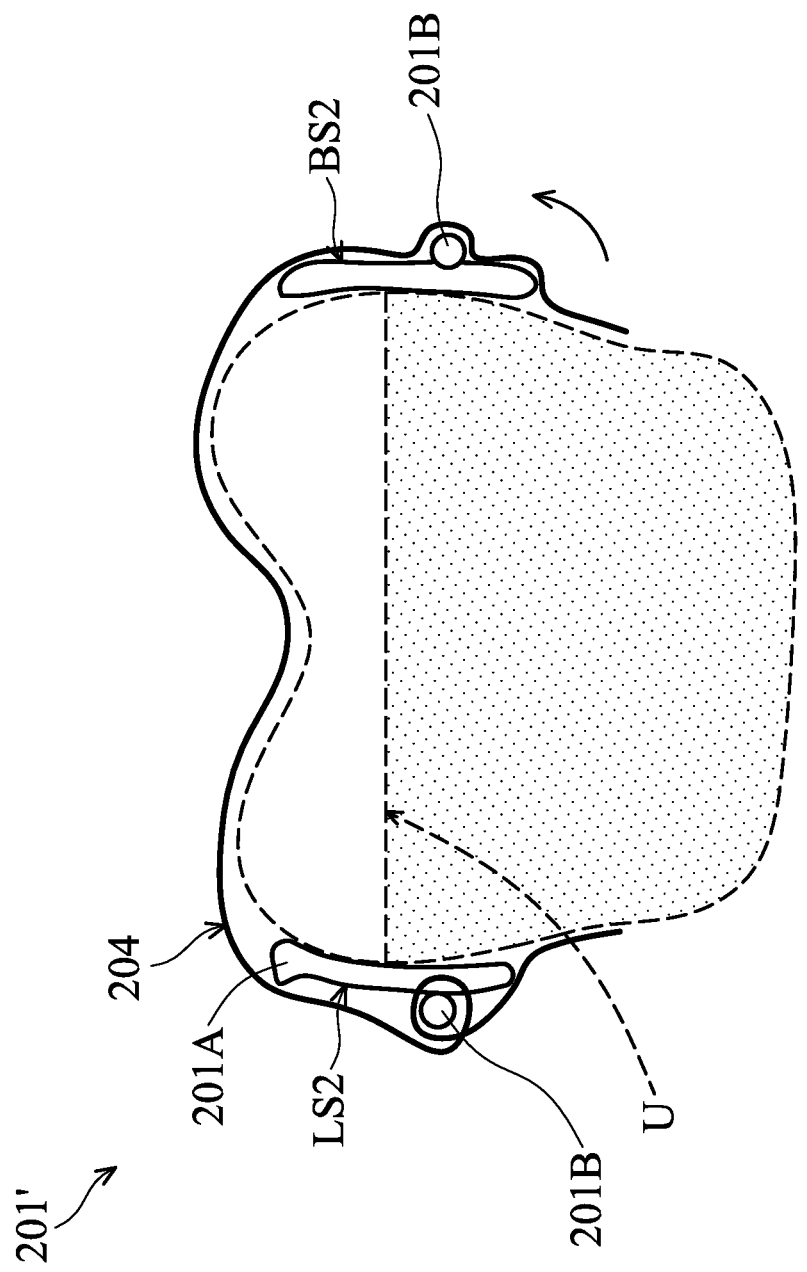
FIG. 13 is a schematic view of the limiting member in FIG. 11 fixing the second correction unit to the teeth.

Note that the second correction unit 201' in the embodiments of FIG. 12 and FIG. 13 further includes a number of limiting members 204 that can enable the second correction unit 201' made of metal material to be stably fixed to the mandibular dental arch 20 when the protrusions 202 push on the first teeth 10A of the maxillary dental arch 10, and can prevent the second correction unit 201' from being easily detached from the mandibular dental arch 20 (it should be understood that the second correction unit 201' made of metal material generally does not extend to the undercut area of the teeth of the mandibular dental arch 20, resulting in poor retention to the mandibular dental arch 20).

As shown in FIGS. 12 and 13, each of the limiting members 204 is, for example, an elastic metal wire that can stretch across the occlusal surface of a part of the teeth of the mandibular dental arch 20 and can be movably coupled to a number of (e.g., two) connecting parts 201B (second connecting parts (for example, rod-shaped structures)) formed on the opposite lingual surface LS2 (second lingual surface) and buccal surface BS2 (second buccal surface) of each tooth receiving part 201A of the second correction unit 201'. For example, one end of the limiting member 204 can be wound and fixed to connecting part 201B on the lingual surface LS2, and the other (opposite) end is coupled to the connecting part 201B on the buccal surface BS2 in a detachable manner (as indicated by the arrow in FIG. 13), thereby facilitating the wearing and removal of the second correction unit 201'. The two ends of the limiting member 204 can also extend to the undercut area of the corresponding tooth to engage with it, so as to improve the stability of the second correction unit 201' fixed to the mandibular dental arch 20 (i.e., enhancing the retention of the second correction unit 201' on the mandibular dental arch 20). In accordance with some embodiments, in addition to the limiting members and the matching structures, a clasp, a clip or a swing-lock mechanism may also be used to improve the stability of the second correction unit 201' in use.

As described above, the embodiments of the present invention provide a variety of removable orthodontic correction devices for pressing the second molar(s) of the maxillary dental arch of the patient into the alveolar bone, which can improve the convenience of use. However, the orthodontic correction devices of the present invention are not limited to only being used to correct the second molar of the maxillary dental arch.

For example, the orthodontic correction device may include a (first) correction unit 101 adapted to be worn on one of the maxillary dental arch or mandibular dental arch of the patient, and the position or number of the (first) openings 101A, connecting part 101B, and the elastic members 102 can be changed to correspond to one or more first teeth needing correction (excessive elongation) of the maxillary dental arch or the mandibular dental arch. Therefore, the elastic force of the elastic members 102 can be utilized to press the first teeth into the alveolar bone to achieve the purpose of correction. Alternatively, the orthodontic correction device may also include a (second) correction unit 201 adapted to be worn on the other of the maxillary dental arch or mandibular dental arch and having one or more protrusions corresponding to the first teeth. The protrusions can pass through the first correction unit 101 to push the first teeth to help achieve the correction (i.e., improving the correction efficiency).

Although embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:

1. An orthodontic correction device, comprising:
   a first correction unit adapted to be removably worn on a dental arch;
   a first receiving part formed in the first correction unit and configured to receive a first tooth of the dental arch which needs correction, wherein a shape of the first receiving part allows the first tooth to move toward an alveolar bone;
   a second receiving part formed in the first correction unit and configured to receive a second tooth of the dental arch which does not need correction, wherein a shape of the second receiving part conforms to a shape of the second tooth and the second receiving part extends to an undercut area of the second tooth;
   a first opening formed on a first occlusal surface of the first correction unit, wherein the first opening is elongated and extends to a first lingual surface and a first buccal surface of the first correction unit which are opposite to each other, a position of the first opening corresponds to a position of the first tooth, and the first opening exposes parts of an occlusal surface, a lingual surface, and a buccal surface of the first tooth;
   a second opening formed on the first occlusal surface of the first correction unit and exposing the first tooth received in the first correction unit, wherein the second opening and the first opening partially overlap and have different shapes when viewed along a direction perpendicular to the first occlusal surface;
   a force exerting assembly configured to contact the first tooth through the first opening, thereby exerting a force on the first tooth to press the first tooth into the alveolar bone; and
   a second correction unit adapted to be removably worn on the opposing dental arch, wherein the second correction unit has a protrusion on a second occlusal surface of the second correction unit, and the protrusion is configured to pass through the second opening on the first occlusal surface of the first correction unit to push the first tooth.

2. The orthodontic correction device as claimed in claim 1, wherein the first opening extends in a first direction when viewed along a direction perpendicular to the first occlusal surface of the first correction unit, and the first direction defines a direction in which the force presses the first tooth into the alveolar bone.

3. The orthodontic correction device as claimed in claim 2 wherein the first opening extends in a second direction relative to the first occlusal surface and has a depth when viewed along a direction perpendicular to the first lingual surface or the first buccal surface of the first correction unit, the second direction defines a direction in which the force presses the first tooth into the alveolar bone, and the depth defines a depth to which the force presses the first tooth into the alveolar bone.

4. The orthodontic correction device as claimed in claim 1, wherein the force exerting assembly includes a plurality of first connecting parts and an elastic member, the first connecting parts are respectively affixed to the first lingual surface and the first buccal surface of the first correction unit corresponding to the first opening, and the elastic member is configured to stretch across the first occlusal surface of the first correction unit to couple with the first connecting parts and contact the first tooth through the first opening, thereby exerting the force on the first tooth to press the first tooth into the alveolar bone, the force being an elastic restoring force.

5. The orthodontic correction device as claimed in claim 4, wherein the elastic member is a U-shaped structure having two side sections parallel to each other and a middle section connecting the side sections, the two side sections are respectively affixed to the first lingual surface and the first buccal surface of the first correction unit and each have a torsion spring portion, and the middle section stretches across the first occlusal surface of the first correction unit and contacts the first tooth through the first opening.

6. The orthodontic correction device as claimed in claim 5, wherein when viewed along a direction perpendicular to the first lingual surface or the first buccal surface of the first correction unit, the first opening extends in a second direction relative to the first occlusal surface, one of the first connecting parts is located on a side of an extension line of the first opening along the second direction, and the two side sections of the elastic member each have a first segment, a second segment, and the torsion spring portion between the first segment and the second segment, wherein the first segment is coupled to the first connecting part, and the second segment extends into the first opening and connects to the middle section of the elastic member.

7. The orthodontic correction device as claimed in claim 4, further comprising a protection element configured to cover a portion of the elastic member in the first opening to prevent the elastic member from directly contacting the first tooth, and the protection element comprises an elastic material.

8. The orthodontic correction device as claimed in claim 1, wherein a shape of the second opening corresponds to a shape of the protrusion when viewed along a direction perpendicular to the first occlusal surface.

9. The orthodontic correction device as claimed in claim 1, wherein a distal end of the second correction unit has an extending portion, the protrusion is formed on the extending portion, and a position of the protrusion corresponds to positions of the second opening and the first tooth.

10. The orthodontic correction device as claimed in claim 9, wherein the second correction unit exposes an occlusal surface of teeth of the opposing dental arch, and the second correction unit further includes a limiting member having elasticity, wherein the limiting member is movably coupled to a plurality of second connecting parts formed on a second lingual surface and a second buccal surface of the second correction unit which are opposite to each other, stretches across the occlusal surface of the teeth of the opposing dental arch, and extends to an undercut area of the teeth, thereby enhancing the retention of the second correction unit on the opposing dental arch.

\* \* \* \* \*